Figure 1:
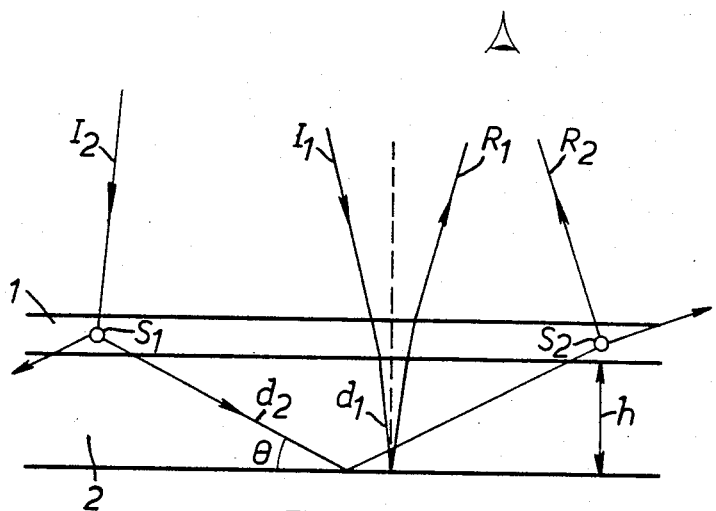

United States Patent
Elliott et al.

[11] 3,910,681
[45] Oct. 7, 1975

[54] LIQUID CRYSTAL DISPLAY DEVICES
[75] Inventors: George Elliott, Sandon near Chelmsford; Brian William Ely, Braintree, both of England
[73] Assignee: The Marconi Company Limited, Chelmsford, England
[22] Filed: Jan. 11, 1974
[21] Appl. No.: 432,583

[30] Foreign Application Priority Data
Jan. 11, 1973  United Kingdom............... 1481/73

[52] U.S. Cl............................. 350/160 LC; 350/164
[51] Int. Cl.²............................................ G02F 1/13
[58] Field of Search............ 350/160 LC, 164, 166

[56] References Cited
UNITED STATES PATENTS
2,873,397  2/1959  Gray............................ 350/164 UX
3,700,306  10/1972  Cartwell et al............ 350/160 LC X
3,736,047  5/1973  Gelber et al................. 350/160 LC
3,824,002  7/1974  Beard........................... 350/160 LC Primary Examiner—Edward S. Bauer
Assistant Examiner—Matthew W. Koren
Attorney, Agent, or Firm—Baldwin, Wight & Brown

[57] ABSTRACT

A liquid crystal display arrangement is described in which the liquid crystal cell includes a reflective mirror in the form of a number of layers of dielectric material, the refractive indices and thicknesses of the various layers being chosen to allow reflection of light scattered from the liquid crystal material at large angles to the normal whilst light from external light sources incident normally on the cell is not reflected thereby improving the contrast of the display.

16 Claims, 3 Drawing Figures

LIQUID CRYSTAL DISPLAY DEVICES

This invention relates to liquid crystal display devices and more specifically to such devices of the reflective type.

A typically known liquid crystal display device of the reflective type consists of a metal mirror deposited on glass and forming one of the two electrodes of the device and a second electrode formed in the desired display pattern provided on a second sheet of glass with a layer of nematic liquid crystal material between the two electrodes.

For maximum contrast display devices of the reflective type as presently known are required to face into a dark background so that an observer sees a reflection of the dark background in non-activated areas of the device. Whilst it is possible to mount the display device so that good visibility is obtained from most directions of view in usual ambient lighting conditions, at some angles and under some lighting conditions specular reflection of the light source may be obtained from the mirror electrode which destroys the contrast of the display.

The present invention seeks to provide an improved liquid crystal display device of the reflective type in which the amount of specularly reflected light returned to a point of view at angles near to normal incidence is reduced.

According to this invention in its broadest aspect, a liquid crystal display device of the reflective type is provided in which the reflective mirror is a dielectric mirror.

According to a feature of this invention, a liquid crystal display device of the reflective type is provided wherein the reflective mirror is a dielectric mirror consisting of layers of material of different refractive indices the thicknesses of which are such that the reflection coefficient in a given part of the spectrum is relatively reduced at angles close to normal incidence. Normally the given part of the spectrum is the visible part of the spectrum.

Normally said layers are alternately of high and low refractive index. Normally again three to seven layers are provided and each has a thickness which is equal to a quarter wavelength at a wavelength below the lower limit of the visible spectrum.

In a preferred embodiment of the present invention said dielectric mirror comprises alternate layers of zinc sulphide and magnesium fluoride, both extreme layers being of zinc sulphide.

Other materials which may be used to provide layers of high refractive index are $CdS$, $TiO_2$, $SiC$ and $SnO_2$. Other materials which may be used for the layers of low refractive index include cryolite ($3NaF.AlF_3$) and $Al_2O_3$.

Since the dielectric mirror is insulated it cannot itself form one of the two electrodes required to activate the device. Accordingly one of the two electrodes required to activate the device is either provided as a thin light transmissive conductive coating on the surface of the dielectric mirror adjacent the liquid crystal material or is provided as an electrode on the extreme surface of the dielectric mirror remote from the liquid crystals material. In this latter case, of course, the device will only operate with A.C. input signals, because the dielectric mirror is an insulator.

As with known constructions either, or both the electrodes associated with the mirror may be patterned.

In an arrangement utilizing a liquid crystal display device in accordance with the present invention, the illumination thereof in dark surroundings may be arranged for by providing means for projecting light around the edge of the device in such manner that the dielectric mirror acts as a light pipe arrangement, carrying light across the face of the display, where, in operation, it is forward scattered by the liquid crystal material in activated areas.

Figure 2:
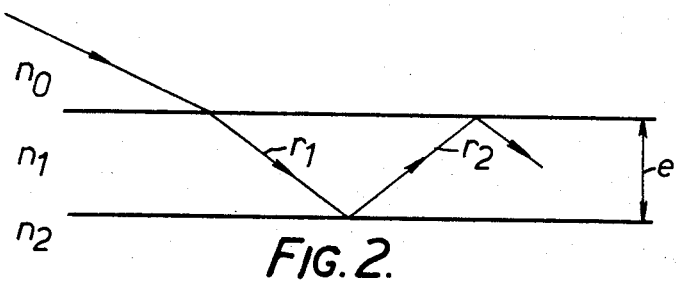
Figure 3:
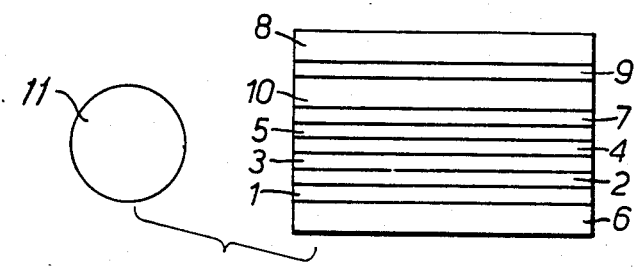

The invention is illustrated in and further described with reference to the accompanying drawing in which, FIGS. 1 and 2 are schematic diagrams illustrating principle of operation of a display device in accordance with the present invention, FIG. 3 is a section through one display device in accordance with the present invention.

Referring to FIG. 1, the layer 1 represents the layer of liquid crystal material in a display device in accordance with the present invention. Layer 2 represents a dielectric mirror which, for the purposes of explaining the principles of operation of the device in accordance with the present invention is assumed for the moment to be a single homogenous layer of dielectric material. Rays of light $I_1$ close to the normal pass through a depth of dielectric $d_1$ which approximates to the thickness $h$ of the layer 2. Rays of light $I_2$ which encounter a scattering center S1, generated by the flow of current in the liquid crystal, send some of the light along path $d_2$, at an angle $\theta$ to the plane of the surfaces. The depth of dielectric $d_2$ is much greater than $d_1$ and is in fact given by $d_2 = h/\sin \theta$. Some of the light reflected from path $d_2$ is returned to the observer by other scattering centers such as S2. In practice, one must consider the net effect of very large numbers of scattering centers such as S1 and S2, spaced through the active area, each covering regions of about 1 micron in diameter.

The reflectivity in the visible spectrum along path $d_2$ is higher than that along path $d_1$. To explain this the operation of a dielectric mirror will now be described with reference to FIG. 2.

A light wave can be represented by a scalar function of the form $$c = a \cos(\omega t + \phi)$$

where the phase $\phi$ is related to the optical path $\Delta$ by the expression $$\phi = 2\pi\Delta/\lambda$$

For a single transparent layer of thickness $e$ and refractive index $n_1$ placed between two transparent media of indices $n_0$ and $n_2$, an incident ray will give rise to a series of internal reflections, of amplitudes $r_1$ at the interface between medium $n_0$ and the thin film and $r_2$ at the interface of the thin film and medium $n_2$ (FIG. 2). Assuming that $$\phi = 2\pi n_1 e/\lambda$$

the reflectance of the thin film can be shown to be $$R = \frac{r_1^2 + r_2^2 + 2r_1r_2 \cos 2\phi}{1 + r_1^2r_2^2 + 2r_1r_2 \cos 2\phi}$$

$R$ is maximum or a minimum if $\phi = (2K+1)(\pi/2)$, i.e., the optical thickness of the film is an odd multiple of $\lambda/4$.

For this value of $\phi$, we have
$R = [(r_1-r_2)/(1-r_1r_2)]^2 = [(n_0n_2-n_1^2)/(n_0n_2+n_1^2)]^2$ $R$ has a minimum if $n_0 < n_1 < n_2$ and a maximum if $n_0 < n_1 > n_2$. When the system is in air, where $n_0 = 1$, there will be a maximum where $n_1>n_2$, and thus a thin film of index $n_1$ greater than that of the base always increases the reflectance of the base. Improved results are obtained by using multiple layers; layers of thickness $\lambda/4$ of alternately high and low refractive index are stacked, which is an iteration of the one-layer system, so that reflectance is enhanced and transmittance reduced, while introducing practically no absorption. Calculations of the reflectance in normal incidence upon a stack of films can be made using the matrix technique.

In practice, good results are obtainable using three to seven layers. If the layer thickness is chosen so that each layer is a quarter wave for a wavelength below the lower limit of the visible spectrum, then for normal incidence the reflection maximum will occur in the ultraviolet range. However, at the very oblique angles encountered in the scattered light system, the effective pathlength in each layer will be much greater, as shown in FIG. 1, and good reflectivity will be obtainable in the visible range. For example if each layer thickness is 700 A., then the reflection maximum for normal incidence will be in the region of 2800 A., but for oblique angles between 22° and 38° to the plane of the device, the reflections will have a maximum in the visible region of the spectrum. Thus, the possible spurious reflections from the mirror at angles near to the normal have been greatly reduced, while a reasonably high reflectivity for randomly scattered light within the liquid crystal layer has been retained.

Referring to FIG. 3, in the practical example of liquid crystal display device illustrated thereby, layers 1, 2, 3, 4 and 5 are provided on a glass substrate 6 of refractive index approximately 1.5. Layers 1, 3 and 5 are each 700 A. of zinc sulphide of refractive index 2.35 and density 4.1, whilst layers 2 and 4 are each 700 A. of magnesium fluoride of refractive index 1.38 and density 3.0. The layers are provided on the glass substrate 6 by sequential evaporation of the materials thereof. On the layer 5 is deposited a thin light transmissive metal or metal oxide (e.g., tin oxide) coating 7 which acts as one electrode of the liquid crystal display cell. A further glass substrate 8 has a light transmissive conductive coating 9 which forms the other electrode for the device, between the two coatings 7 and 9 is provided a layer of nematic liquid crystal material of thickness between 0.00025 and 0.0025 inch. Conductive coatings 7 and 9 are of tin oxide or indium oxide.

If the device is to be operated in dark surroundings light may be projected along the edge of the device using a thin strip lamp or a light pipe. The dielectric layers 1 to 5 then act as light pipes carrying the light across the face of the display where it is forward scattered by liquid crystal material in activated areas.

As an alternative to providing the light transmissive conducting layer 7 on layer 5, it may be provided between the dielectric layers 1 to 5 and the substrate 6. In this case, however, the display device will only operate with A.C. input signals, because of the insulating nature of the layers 1 to 5, whereas with the light transmissive coating 7 provided as shown in FIG. 3 either A.C. or D.C. input signals may be provided.

We claim:

1. A liquid crystal display device operating by reflection for radiant energy within a given spectral range and including a front plate and a reflective mirror with a layer of liquid crystal material therebetween, wherein the reflective mirror is a dielectric mirror consisting of layers of material of different refractive indices the thicknesses of which are such that the mirror is substantially transparent for said radiant energy which is incident at angles close to normal incidence and is substantially reflective for said radiant energy which is incident at other angles.

2. A device as claimed in claim 1 and wherein said given spectral range is the visible part of the spectrum.

3. A device as claimed in claim 1 and wherein said layers are alternately of high and low refractive index.

4. A device as claimed in claim 1 and wherein said dielectric mirror has three to seven layers.

5. A device as claimed in claim 1 and wherein each of said layers has a thickness which is equal to a quarter wavelength at a frequency in the ultraviolet portion of the spectrum.

6. A device as claimed in claim 1 and wherein said dielectric mirror comprises alternate layers of zinc sulphide and magnesium fluoride, both extreme layers being of zinc sulphide.

7. A device as claimed in claim 1 and further comprising two electrodes to activate the device, one of which is provided as a thin light transmissive conductive coating on the surface of the dielectric mirror adjacent the liquid crystal material.

8. A device as claimed in claim 1 and further comprising two electrodes to activate the device, one of which is provided as an electrode on the extreme surface of the dielectric mirror remote from the liquid crystals material.

9. In a liquid crystal display device of the reflective type including first and second insulating substrates disposed one parallel to the other, a first electrode comprising a coating of light transmissive metal formed adjacent to the face of said first substrate between said first and second substrates, a second electrode comprising a coating of light transmissive metal formed on the face of said second substrate between said first electrode and said second substrate, and a layer of nematic liquid crystal formed between said aforementioned electrodes, and means connected to said electrodes for applying a voltage across said liquid crystal so as to cause light incident on said liquid crystal to be obliquely scattered therein, the improvement wherein there is provided between said liquid crystal and said first substrate and adjacent to said first electrode a dielectric mirror comprising a plurality of layers of material of different refractive indices, the thickness of which are such that light within the visible spectrum impinging at an approximate normal angle of incidence and not scattered within said liquid crystal is substantially transmitted through said mirror, while visible light impinging on said device and obliquely scattered within said liquid crystal is substantially reflected by said mirror due to the greater effective depth of said dielectric mirror experienced by the obliquely scattered light.

10. A device as recited in claim 9 wherein said dielectric mirror comprises a plurality of layers so arranged as to provide alternately high and low refractive indices.

11. A device as recited in claim 9 wherein said dielectric mirror comprises a plurality of layers three to seven in number.

12. A device as recited in claim 9 wherein each layer within said dielectric mirror has a thickness equal to one-quarter of a wavelength of radiant energy having a frequency in the ultraviolet.

13. A device as recited in claim 9 wherein said dielectric mirror comprises alternate layers of zinc sulphide and magnesium fluoride, both outer layers being zinc sulphide.

14. A device as recited in claim 9 wherein said dielectric mirror is positioned between said first electrode and said first substrate so that the coating of light transmissive metal comprising said first electrode is formed on the surface of said dielectric mirror adjacent to said liquid crystal.

15. A device as recited in claim 9 wherein said dielectric mirror is positioned between said liquid crystal and said first electrode so that the coating of light transmissive metal comprising said first electrode is formed on the surface of said dielectric mirror remote from said liquid crystal.

16. In a liquid crystal display device operating by reflection of radiant energy having a given spectral range and of the type having a substantially transparent front plate, a substantially transparent back plate provided with reflective means on that side thereof facing said front plate, a layer of liquid crystal material between said plates, and means for applying voltage across said layer of liquid crystal material to produce light scattering centers therein, the improvement wherein:

said back plate has a selected index of refraction $n_2$ and said reflective means includes at least two layers of substantially transparent material, one layer being in contact with said back plate and having an index of refraction $n_1$ and the other layer being in contact with said one layer and having an index of refraction $n_o$, the thickness of said reflective means being an odd multiple of a quarter wavelength for radiant energy having a selected frequency higher than frequencies within said given spectral range and the aforesaid indices of refraction being such that $n_0 < n_1 > n_2$ whereby (1) the reflectance for radiant energy of said selected frequency higher than the frequencies within said given spectral range which enters said front plate at angles near to normal incidence and passing through said liquid crystal material in the absence of voltage thereacross is a maximum while the reflectance for radiant energy within said given spectral range which enters said front plate at angles near to normal incidence and passing through said liquid crystal material in the absence of voltage thereacross is greatly reduced in magnitude from said maximum reflectance and (2) the reflectance for radiant energy within said given spectral range entering said front plate at angles near to normal incidence and passing through said liquid crystal material in the presence of voltage thereacross is substantially said maximum reflectance.

* * * * *